United States Patent
Wanda

(10) Patent No.: US 7,277,194 B2
(45) Date of Patent: Oct. 2, 2007

(54) OUTPUT CONTROL APPARATUS, OUTPUT CONTROL SYSTEM, OUTPUT CONTROL METHOD, COMPUTER-READABLE RECORDING MEDIUM, AND COMPUTER PROGRAM FOR COMMUNICATING WITH A PLURALITY OF PRINTING APPARATUSES

(75) Inventor: Koichiro Wanda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 767 days.

(21) Appl. No.: 10/268,903

(22) Filed: Oct. 11, 2002

(65) Prior Publication Data

US 2003/0076524 A1    Apr. 24, 2003

(30) Foreign Application Priority Data

Oct. 16, 2001  (JP)  ............... 2001-318388

(51) Int. Cl.
G06F 3/12       (2006.01)
G06K 15/00     (2006.01)

(52) U.S. Cl. .................... 358/1.15; 358/1.14
(58) Field of Classification Search ........... 358/1.14, 358/1.15, 1.1, 1.13, 400, 403, 405
See application file for complete search history.

(56) References Cited

U.S. PATENT DOCUMENTS

| | | | | |
|---|---|---|---|---|
| 5,625,757 A | * | 4/1997 | Kageyama et al. | 358/1.15 |
| 5,845,057 A | | 12/1998 | Takeda et al. | 395/114 |
| 6,157,465 A | | 12/2000 | Suda et al. | |
| 6,452,692 B1 | * | 9/2002 | Yacoub | 358/1.15 |
| 6,457,044 B1 | * | 9/2002 | IwaZaki | 709/206 |
| 2001/0007619 A1 | | 7/2001 | Kakutani | 400/582 |
| 2002/0163666 A1 | * | 11/2002 | Iwata et al. | 358/1.15 |

FOREIGN PATENT DOCUMENTS

| | | |
|---|---|---|
| JP | 09-150566 A | 6/1997 |
| JP | 10-136143 A | 5/1998 |
| JP | 2000-010741 A | 1/2000 |
| JP | 2001-034122 A | 2/2001 |
| JP | 2001-191618 A | 7/2001 |

OTHER PUBLICATIONS

European Search Report dated Feb. 2, 2007, issued in counterpart application.

* cited by examiner

*Primary Examiner*—Douglas Q. Tran
(74) *Attorney, Agent, or Firm*—Fitzpatrick, Cella, Harper & Scinto

(57) ABSTRACT

An output destination of a job can be arbitrarily selectively used in accordance with an application of the user. If a state of each of printers to which the print job should be outputted is abnormal, if the states of the printers are unknown, or if there is a trouble in the obtainment and holding of the states of the printers, by controlling so as to output the print job at the output destination according to each situation with reference to an output destination change instruction table which has preliminarily been registered by the user, the output destination of the job is not always changed. If the output destination is changed, the output destination can be manually changed, thereby enabling the job to be outputted at the output destination according to the application of the user.

18 Claims, 5 Drawing Sheets

FIG. 7

OUTPUT DESTINATION CHANGE INSTRUCTION TABLE 700

| CASE | | CONTENTS OF FAULT | AUTOMATIC OUTPUT DESTINATION CHANGE | MANUAL OUTPUT DESTINATION CHANGE |
|---|---|---|---|---|
| FAULT OF OUTPUT APPARATUS | | TURN OFF POWER SOURCE & COME-OUT OF CABLE | EXECUTE | ... |
| | | JAM | EXECUTE | ... |
| | | DOOR IS OPEN | NOT EXECUTE | NOT EXECUTE |
| | | NO PAPER | NOT EXECUTE | EXECUTE |
| | | ... | ... | ... |
| STATE IS UNKNOWN | | STATE IS UNKNOWN | NOT EXECUTE | EXECUTE |
| SYSTEM ABNORMALITY | | STATE CANNOT BE OBTAINED | NOT EXECUTE | EXECUTE |

OUTPUT CONTROL APPARATUS, OUTPUT CONTROL SYSTEM, OUTPUT CONTROL METHOD, COMPUTER-READABLE RECORDING MEDIUM, AND COMPUTER PROGRAM FOR COMMUNICATING WITH A PLURALITY OF PRINTING APPARATUSES

BACKGROUND OF THE INVENTION

1. Field of the Invention

The invention relates to an output control apparatus, an output control system, an output control method, a computer-readable recording medium, and a computer program. More particularly, the invention is suitable when it is used for outputting a job by an optimum output apparatus.

2. Related Background Art

Hitherto, in a system such that data is outputted by an output apparatus such as a printer or the like, if an alternative output apparatus or an automatic output destination changing function for presetting deciding conditions is used, when the output apparatus in which the automatic output destination changing function has been set enters a state where a job cannot be outputted, the output destination is certainly changed to the alternative output apparatus such as another output apparatus recorded in a table, output apparatus in a normal state, or the like.

Also, the output destination is certainly changed in a case where it is not always difficult to restart a print such as case where difficulty of recovery of the output apparatus is not known when even a state of the output apparatus cannot be grasped, case where a judgment of a situation of the output apparatus is inaccurate due to a fault on a host computer side, or the like.

However, according to the conventional technique as mentioned above, only the operation such that if the alternative output apparatus or the automatic output destination changing function which presets the deciding conditions is used, in the case where the output apparatus in which the automatic output destination changing function has been set enters the state where a job cannot be outputted, the output destination is certainly changed to the alternative output apparatus such as another output apparatus recorded in the table, output apparatus in the normal state, or the like can be executed.

Therefore, even in a fault of the output apparatus such as "door is open", "no paper", or the like which occurs relatively often and can be easily recovered, the unnecessary change in output destination is executed. Thus, a load of another output apparatus is increased or stress of the user who uses another output apparatus is increased.

Only the operation such that the output destination is certainly changed in a case where it is not always difficult to restart a print such as case where difficulty of recovery of the output apparatus is not known when even a state of the output apparatus cannot be grasped, case where a judgment of a situation of the output apparatus is inaccurate due to a fault on a host computer side, or the like can be executed.

In the case where the user wants to determine the output destination by himself each time in accordance with various situations such that a job cannot be outputted from the output apparatus, both of a manual output destination changing function and the automatic output destination changing function cannot be used together.

Further, the operation such that the user arbitrarily designate the presence or absence of the automatic output destination change or a shift to the manual output destination change or the user registers and selectively uses those functions in accordance with various situations such as case where the states of those output apparatuses are unknown, case where the state of the output apparatus cannot be correctly grasped due to a fault of the host computer or system for controlling the output apparatuses, and the like cannot be executed.

SUMMARY OF THE INVENTION

In consideration of the above circumstances, it is an object of the invention to enable an output destination of a job to be arbitrarily and selectively used in accordance with an application of the user.

According to an aspect of the invention, there is provided an output control apparatus for controlling the operation of a set output apparatus which has been set so as to be used for outputting a job, wherein either a mode of setting the set output apparatus to an output destination of the job as it is or a mode of changing the output destination of the job so as to execute the job by another output apparatus different from the set output apparatus is selected on the basis of a state of the set output apparatus, and the output destination of the job is determined.

According to another aspect of the invention, there is provided an output control apparatus for controlling the operation of a set output apparatus which has been set so as to be used for outputting a job, comprising: output apparatus detecting means for detecting a state of the set output apparatus; and output destination determining means for selecting either a mode of setting the set output apparatus to an output destination of the job as it is or a mode of changing the output destination of the job so as to execute the job by another output apparatus different from the set output apparatus on the basis of a result detected by the output apparatus detecting means and determining the output destination of the job.

According to still another aspect of the invention, the output destination determining means sets the set output apparatus to the output destination of the job as it is in accordance with the state of the set output apparatus detected by the output apparatus detecting means.

According to further another aspect of the invention, the output control apparatus has output destination registering means for registering information showing that the set output apparatus is set to the output destination of the job as it is in accordance with the state of the set output apparatus into a predetermined memory area in accordance with designation of the user, and the output destination determining means determines the output destination of the job from a plurality of output apparatuses on the basis of contents registered by the output destination registering means.

According to further another aspect of the invention, the output destination registering means registers information indicative of permission or inhibition of the change in output destination of the job and information indicative of a shift to a manual output destination changing function into a predetermined memory area every state of the set output apparatus.

According to further another aspect of the invention, when it is detected by the output apparatus detecting means that the state of the set output apparatus is unknown, the output destination determining means sets the set output apparatus whose state is unknown to the output destination of the job as it is.

According to further another aspect of the invention, when the state of the set output apparatus is unknown, the output destination registering means registers information showing that the set output apparatus whose state is unknown is set to the output destination of the job as it is into a predetermined memory area in accordance with designation of the user, and the output destination determining means determines the output destination of the job from a plurality of output apparatuses on the basis of contents registered by the output destination registering means.

According to further another aspect of the invention, when the state of the set output apparatus is unknown, the output destination registering means registers information indicative of permission or inhibition of the change in output destination of the job and information indicative of a shift to a manual output destination changing function into a predetermined memory area.

According to further another aspect of the invention, even if it is detected by the output apparatus detecting means that there is a trouble in the obtainment of the state of the set output apparatus or the holding of the state of the set output apparatus, the output destination determining means sets the set output apparatus whose state is unknown to the output destination of the job as it is.

According to further another aspect of the invention, when there is a trouble in the obtainment of the state of the set output apparatus or the holding of the state of the set output apparatus, the output destination registering means registers information showing that the set output apparatus whose state is unknown is set to the output destination of the job as it is into a predetermined memory area in accordance with designation of the user, and output destination determining means determines the output destination of the job on the basis of contents registered by the output destination registering means.

According to further another aspect of the invention, when there is a trouble in the obtainment of the state of the set output apparatus or the holding of the state of the set output apparatus, the output destination registering means registers information indicative of permission or inhibition of the change in output destination of the job and information indicative of a shift to a manual output destination changing function into a predetermined memory area.

According to further another aspect of the invention, when the state of the set output apparatus is detected by the output apparatus detecting means, when it is detected that the state of the set output apparatus is unknown, and when it is detected that there is a trouble in the obtainment of the state of the set output apparatus or the holding of the state of the set output apparatus, the output destination determining means discriminates permission or inhibition of the change in output destination of the job and a shift to a manual output destination changing function and determines the output destination of the job from a plurality of output apparatuses.

According to further another aspect of the invention, when the state of the set output apparatus is detected, when it is detected that the state of the set output apparatus is unknown, and when there is a trouble in the obtainment of the state of the set output apparatus or the holding of the state of the set output apparatus, the output destination registering means registers information indicative of permission or inhibition of the change in output destination of the job and information indicative of a shift to a manual output destination changing function into a predetermined memory area in accordance with designation of the user, and the output destination determining means determines the output destination of the job from a plurality of output apparatuses on the basis of contents registered by the output destination registering means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 7 shows the embodiment of the invention and is a diagram showing an example of a table for recording instructions of the user which are used in an output destination changing process in the print system.

DETAILED DESCRIPTION OF THE PREFERRED EMBODIMENTS

Figure 1:
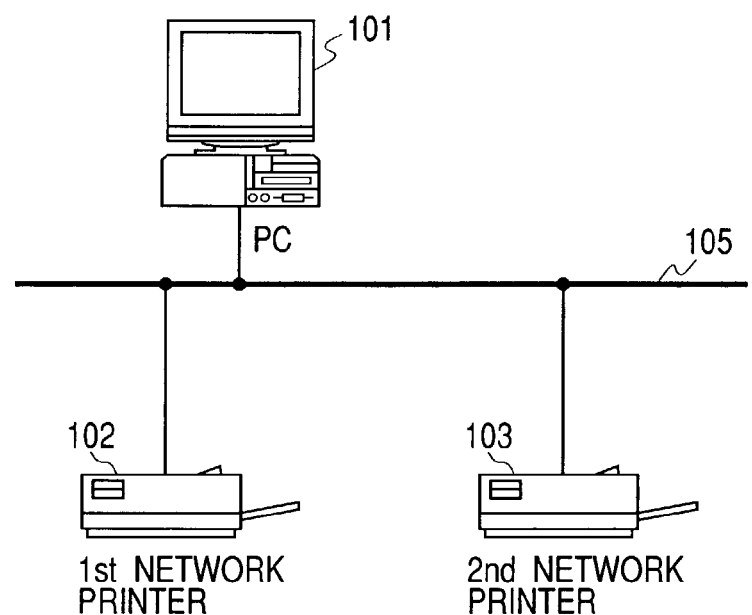
FIG. 1 shows an embodiment of the invention and is a diagram showing an example of a construction of a print system.

An embodiment of an output control apparatus, an output control system, and an output control method of the invention will now be described with reference to the drawings. FIG. 1 is a constructional diagram of a print system as an example of the output control system in the embodiment.

In FIG. 1, reference numeral 101 denotes a personal computer (PC) arranged as an output control apparatus for executing an output destination changing method in the embodiment; and 102 and 103 indicate a first network printer and a second network printer which are managed as output destinations by the print system and arranged as output apparatuses. Those printers are connected by a network line 105, respectively.

Although only one personal computer (PC) 101 is shown in FIG. 1, the print system can be also replaced with a print system such that means for executing a procedure of the embodiment is shared or linked by a plurality of personal computers (PCs).

Although the embodiment has been described with respect to an example of the network printers 102 and 103, the output destination changing method can be applied independent of a connecting method of the output apparatuses (network printers) and a host computer and is not limited to that shown in the embodiment.

Figure 2:
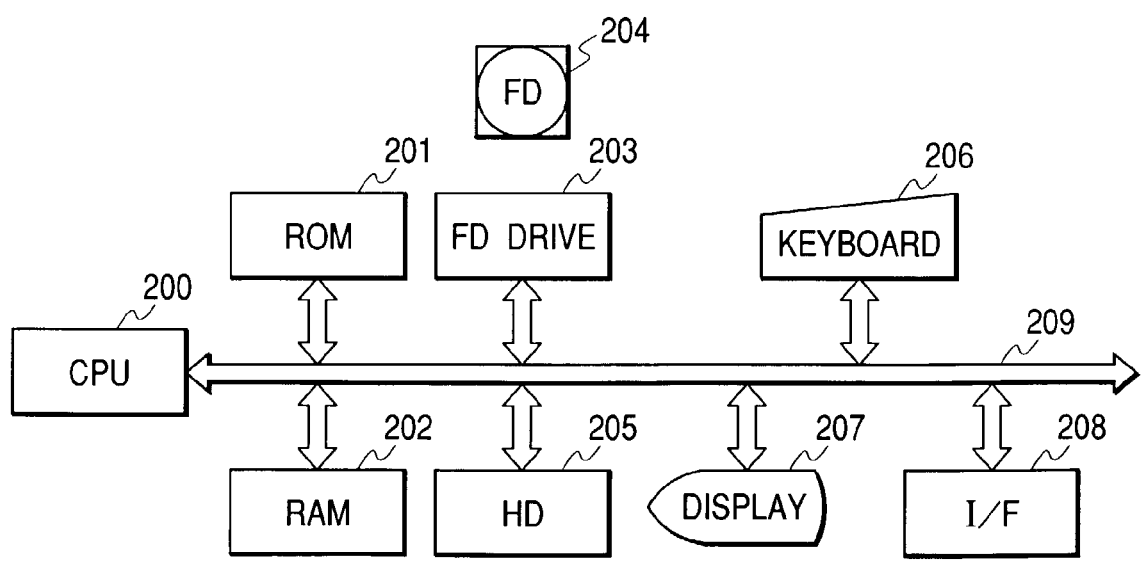
FIG. 2 shows the embodiment of the invention and is a block diagram showing an example of a schematic construction of a personal computer (PC)

FIG. 2 shows a schematic construction of the personal computer (PC) 101 shown in FIG. 1. In FIG. 2, reference numeral 200 denotes a CPU, 201 an ROM, and 202 an RAM. The CPU 200 executes various processes on a client by using the RAM 202 as a work memory in accordance with a program stored in the ROM 201 or RAM 202.

Figure 5:
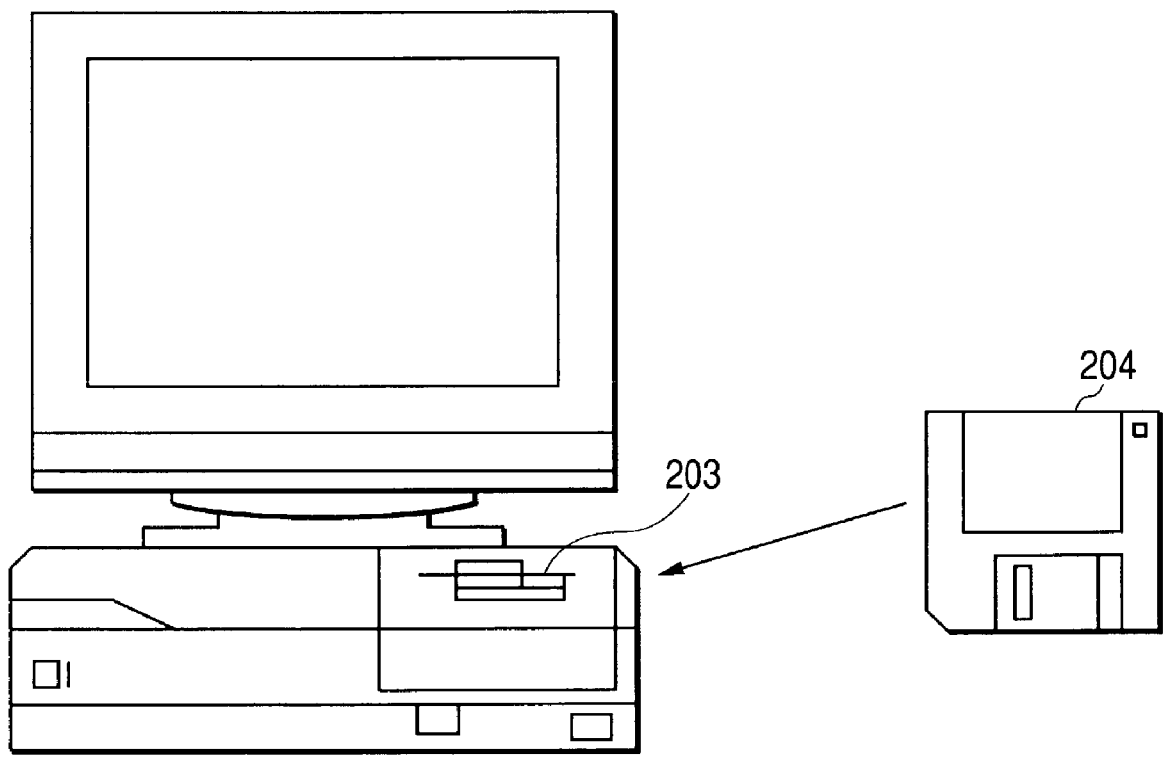
FIG. 5 shows the embodiment of the invention and is a diagram showing a relation between the personal computer and the flexible disk.

Reference numeral 203 denotes an FD drive. As shown in FIG. 5, a flexible disk 204 is inserted into the FD drive 203. An input and an output of data are executed between the client machine (PC) 101 and the flexible disk 204.

Figure 4:
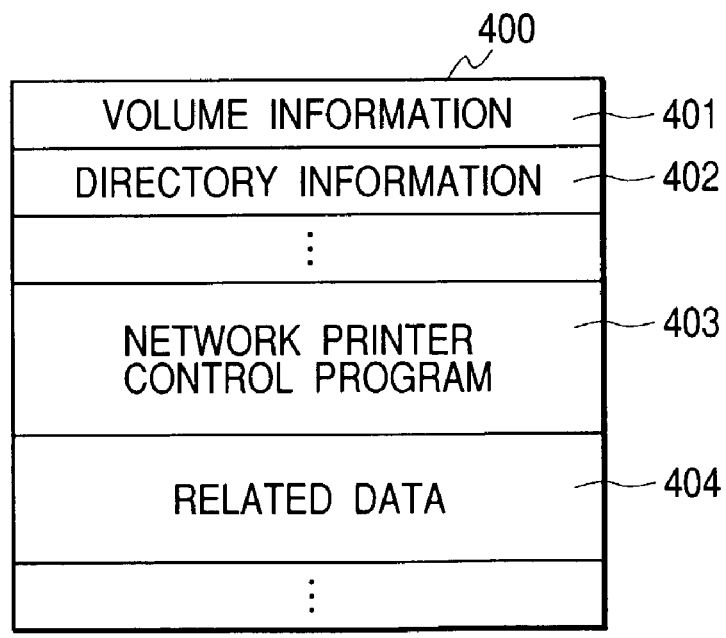
FIG. 4 shows the embodiment of the invention and is a diagram showing an example of a memory map showing data in the flexible disk.

FIG. 4 is a diagram showing a memory map of the data in the flexible disk 204. As shown in FIG. 4, volume information 401, directory information 402, a control program 403 for the network printers 102 and 103, and related data 404 have been stored in a memory map 400 in the flexible disk 204.

Figure 3:
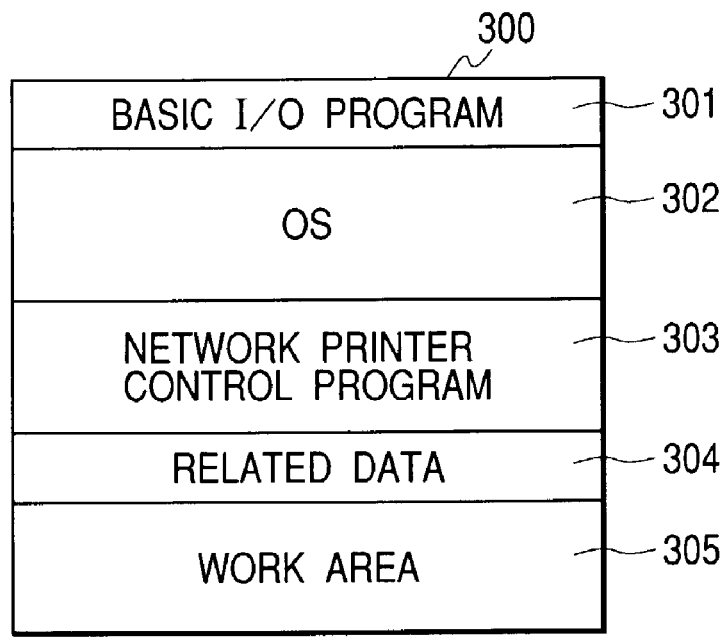
FIG. 3 shows the embodiment of the invention and is a diagram showing an example of a memory map at the time when a program is developed from a flexible disk into an RAM.

FIG. 3 is a diagram showing a memory map in the case where a control program 303 is developed from the flexible disk 204 into the RAM 202.

As shown in FIG. 3, a memory map 300 in the RAM 202 has: areas for storing a basic I/O program 301, an operating system (OS) 302, the network printer control program 303 developed from the flexible disk 204, and related data 304; and a work area 305.

Reference numeral 205 denotes a hard disk (HD); 206 a keyboard; 207 a display; and 208 a network board. The network board (interface) 208 has a communicating function.

The component elements in a range from the CPU 200 to the interface 208 (excluding the flexible disk 204) mentioned above are connected via a system bus 209 and can mutually transmit and receive data.

Figure 6:
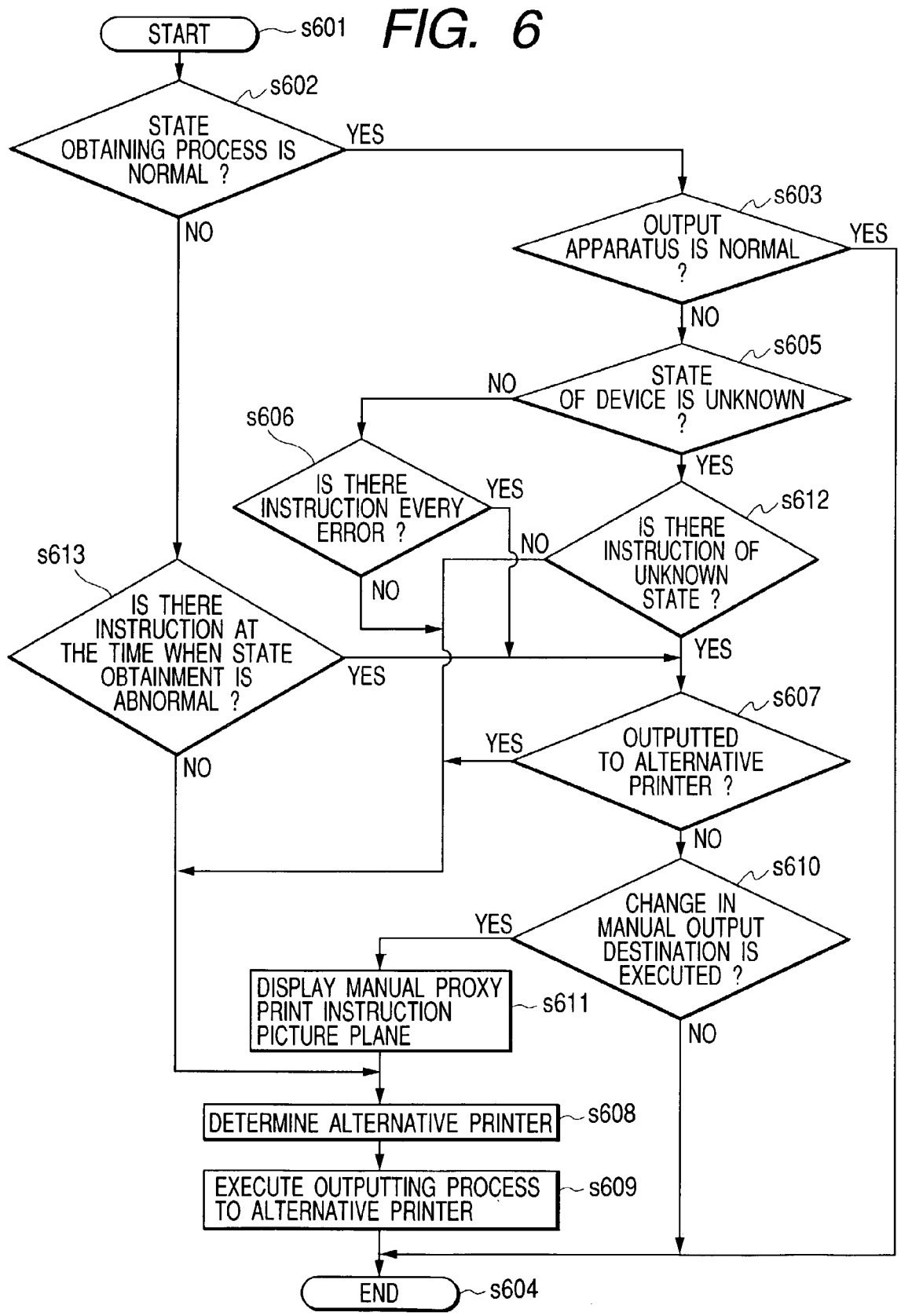
FIG. 6 shows the embodiment of the invention and is a flowchart for explaining an example of a procedure for executing an output destination changing method in the print system.

FIG. 6 is a flowchart showing processes of the output destination changing method in the embodiment. FIG. 7 shows an output destination change instruction table 700 which is preliminarily formed by an instruction of the user in order to discriminate whether an automatic output destination change is performed or not.

The table 700 is formed every concept for setting an alternative printer by the automatic output destination changing function. For example, in the case of the automatic output destination changing function such that an alternative printer object is registered every printer object of "Windows" (registered trademark), the table is formed every printer object to print. In the case of the automatic output destination changing function such that the network printer is identified by an IP address and an alternative printer is registered, by forming the table every IP address, the output destination changing method in the embodiment can be realized.

As mentioned above, the operation to register the output destinations into the output destination change instruction table 700 in accordance with designation of the user so that the output destination of a job can be determined on the basis of the state of the output apparatus is executed by output destination registering means constructed as a program by a computer system of the host computer 101.

A procedure for determining the presence or absence of the execution of the output destination change in accordance with a fault of the output apparatus as an example of the output destination changing method in the print system of the embodiment will be described hereinbelow with reference to FIG. 6.

In step S601, in a print environment such that jobs can be outputted from the personal computer (PC) 101 as shown in FIG. 1 to the plurality of printers 102 and 103, the system is in a state where when the printer is abnormal, the output destination is automatically changed, a mode for outputting data again or a mode for outputting residual print data has been set, the job has already been transmitted to the printer 102, and the state of the printer 102 is monitored. In the embodiment, the case where the first network printer 102 is the set output apparatus which has been set so as to be used for outputting the job will be explained as an example.

The personal computer (PC) 101 which transmitted the job advances to step S602. By a method such as communicating process with the printer 102, operating situation of software which is operating on the personal computer (PC) 101, or the like, the PC 101 conforms that a state obtaining process of the printer 102 is operating normally and the state of the printer 102 could be obtained. Step S603 follows and a discriminating process about the state of the printer 102 is periodically executed.

If the printer 102 is normal in step S603, the output destination is not changed but step S604 follows. The present process is finished or stopped.

In step S604, an initializing process such that a memory prepared for the output destination changing process in the embodiment or the like is released or the like is executed irrespective of the presence or absence of the output destination changing process. At next discrimination timing, a similar discriminating process is executed from step S601.

Although the embodiment will be explained with respect to an example in which a polling about the state of the printer 102 is periodically executed or the discrimination about the state of the printer 102 is periodically made, for example, the state discriminating process can be also irregularly executed or a state change notification can be also sent from a printer or another personal computer (PC) 101 which monitors the printer. That is, the print system of the embodiment does not depend on the timing for the discriminating process in step S603. The other printer 103 connected to the personal computer (PC) 101 via the network line 105 can be also set to the foregoing set output apparatus.

If the abnormality of the printer 102 is detected in step S603, step S605 follows. Whether the printer 102 has normally returned its own state or not is discriminated.

For example, in the case where the controller normally notifies the system of a situation of the printer 102 like "jam", contents of a fault is notified by a method whereby they are displayed by a GUI (Graphical User Interface), informed by a voice sound, or the like. The processing routine advances to step S606.

The processes in steps S602, S603, and S605 as mentioned above are executed by output apparatus detecting means constructed as a program by the computer system of the host computer 101.

In step S606, whether the output destination change according to instructions of the user for the present fault of the printer is automatically performed or not is discriminated with reference to the output destination change instruction table 700 as shown in FIG. 7 in which the instructions of the user have previously been registered.

If the instructions of the user as shown in FIG. 7 have been registered, step S607 follows and whether the output destination change to the alternative printer is automatically executed or not is discriminated.

If a status of each of the printers 102 and 103 indicates "turn off of power source", "come-out of cable", or "jam" in step S603, since an instruction to execute the automatic output destination change has been registered by referring to the output destination change instruction table 700 in FIG. 7, the processing routine advances to step S608. The alternative printer is determined.

As means for determining the alternative printer, there are various methods such as method whereby such a printer has previously been registered, method whereby the output apparatus is selected in accordance with the print job, method whereby the printer in which the number of jobs is small is selected, and the like. However, the print system of the embodiment can be applied independent of the determining method of the alternative printer.

Subsequently, when the outputting process from the alternative printer is executed in step S609, step S604 follows. The automatic output destination changing process according to the instruction of the user is finished.

If a discrimination result of the printer status in step S603 indicates "door is open", since there is an instruction such that the automatic output destination change is not executed as designated in the output destination change instruction table 700 in FIG. 7 in step S606, step S610 follows.

In this case, since the manual output destination change is not instructed either, step S604 follows. The output destination is not changed. The processing routine is finished.

If there is no instruction of the user in step S606, step S608 follows as it is and the alternative printer is determined. In step S609, the outputting process from the alternative printer is executed. Step S604 follows and the automatic output destination changing process is executed according to the initial set contents. The processing routine is finished.

Further, in step S603, if the printer status indicates "no paper", the automatic output destination change is not executed in step S607. The execution of the manual output destination change is confirmed in step S610. In step S611, for example, a manual output destination change instruction picture plane like a dialog box is displayed. The apparatus waits for an instruction for output destination change from the user.

From this picture plane, when the user again determines the output destination printer and designates a printer name from a user interface UI, step S608 follows. The output destination printer is determined. Step S609 follows and the outputting process of the printer is executed. Step S604 follows and the processing routine is finished.

In this case, if the alternative printer is designated, the outputting process from the alternative printer is executed. However, if the user does not change the output destination, processes can be similarly executed as it is by a procedure for continuing the printing process or a re-transmitting process of the print job.

The processes in steps S607 and S610 as mentioned above are executed by output destination determining means constructed as a program by the computer system of the host computer 101.

By discriminating the presence or absence of the execution of the automatic output destination change every fault of the printer 102 and controlling the execution of the output destination change by an executing procedure of the output destination changing method of the embodiment as mentioned above, it is possible to control in a manner such that in the case of a fault like "door is open" such that the printer 102 can be relatively easily returned to the normal state without losing the print data, the output destination change is not automatically performed, and in the case of a fault like "turn-off of power source", "jam", or the like such that even if the user returns the printer 102 to the normal state, the print data is lost or it takes a long time for recovery, the output destination change is automatically executed.

As shown in the example of "no paper", the automatic output destination changing function can be also selectively used in association with the manual output destination changing function in accordance with a fault.

Therefore, the printer which outputs the print job can be selected in accordance with a degree of the fault of the printer 102. A situation such that a load of the other printer 103 is wastefully increased is eliminated. The stress of the user who uses the other printer 103 can be reduced.

Subsequently, a procedure for discriminating the presence or absence of the output destination change in the case where the state of the output apparatus cannot be correctly discriminated will be described with reference to FIGS. 6 and 7.

In step S601, in a manner similar to the case mentioned above, in the print environment in which a print job can be outputted from the personal computer (PC) 101 to the plurality of network printers 102 and 103 as shown in FIG. 1, the mode such that when the printer is abnormal, the output destination is automatically changed and the print data is outputted again or the residual print data is outputted has been set, the job has already been transmitted, and the state of the printer 102 is monitored.

The personal computer (PC) 101 which transmitted the job advances to step S602. By the method such as communicating process with the printer 102, operating situation of software which is operating on the personal computer (PC) 101, or the like, the PC 101 confirms that the state obtaining process of the printer is operating normally and the state of the printer 102 could be obtained. The processing routine advances to step S603 and the discriminating process of the state of the printer 102 is periodically executed.

If the printer 102 is normal in step S603, the output destination is not changed. Step S604 follows and the present process is finished or stopped. Similar discriminating processes are executed from step S601 at timing of the next discrimination.

If the abnormality of the printer 102 is detected in step S603, step S605 follows and whether the printer 102 could normally return its own state or not is discriminated. Unlike the ordinary fault, however, in the case of a fault such that a service call error or the like is returned from the printer 102 and the state of the printer 102 cannot normally be obtained due to the abnormality of the controller itself of the printer 102, the user is notified of the fact that the state is unknown. The processing routine advances to step S612.

The processes in steps S602, S603, and S605 as mentioned above are executed by the output destination determining means constructed as a program by the computer system of the host computer 101.

In step S612, if there is an instruction in the case where the state is unknown with reference to the output destination change instruction table 700, whether the output destination change is automatically executed or not is discriminated in step S607.

If the mode such that the automatic output destination change is not executed has been set as shown in FIG. 7, step S610 follows. Whether the mode such that the manual output destination change is executed has been set by the user or not is discriminated with reference to the output destination change instruction table 700 in FIG. 7. In step S611, a manual proxy print instruction picture plane is displayed.

In step S611, when the output destination is instructed from the user, in a manner similar to that mentioned above, step S608 follows and the output destination printer is determined. In step S609, the outputting process is executed. The processing routine is finished in step S604.

The processes in steps S607 and S610 as mentioned above are executed by the output destination determining means constructed as a program by the computer system of the host computer 101.

As mentioned above, in the case of a fault such that the state of the printer 102 cannot be correctly obtained due to the abnormality of the printer 102 itself, control is made in a manner such that the user is notified of the fact that the state is unknown and the automatic output destination change is not executed. Therefore, the printer 102 whose state is unknown can be set to the output destination as it is or the output destination of the job can be changed by the manual operation of the user.

Thus, in addition to the foregoing effect, even if the state of the printer to which the user intends to output the print job is unknown, it is possible to allow the desired printer of the user to output the print job.

Although the embodiment has been described with respect to the case of a special fault such that the state of the printer 102 cannot be correctly obtained but is unknown, in the case where the fault can be relatively easily recovered by the resetting or the like of the printer 102, or the like, the print job can be also outputted to the same printer 102 without changing the output destination in a manner similar to the case mentioned above.

Subsequently, a procedure for discriminating the presence or absence of the output destination change in the case where the state of the printer cannot be obtained due to the abnormality or the like of the system on the personal computer (PC) side will be described with reference to FIGS. 6 and 7.

In step S601, in a manner similar to the case mentioned above, in the print environment such that the jobs can be outputted from the personal computer (PC) 101 to the plurality of printers 102 and 103 as shown in FIG. 1, the mode such that when the printer is abnormal, the output destination is automatically changed, the print data is outputted again or the residual print data is outputted has been set, the job has already been transmitted to the printer 102, and the state of the printer 102 is monitored.

The personal computer (PC) 101 which transmitted the job advances to step S602. By the method such as communicating process with the printer 102, operating situation of software which is operating on the personal computer (PC) 101, or the like, the PC 101 conforms that the state obtaining process of the printer 102 is operating normally and the state of the printer could be obtained.

The process in step S602 as mentioned above is executed by output apparatus detecting means constructed as a program by the computer system of the host computer 101.

However, for example, in the case where the special personal computer (PC) 101 which monitors the states of the printers 102 and 103 notifies another personal computer (PC), if abnormality occurs in the personal computer (PC) for obtaining the states of the printers 102 and 103 or, although the transmitting process to the printers 102 and 103 can be performed on each personal computer (PC), if the states of the printers cannot be obtained on the personal computer (PC) 101 side irrespective of the states of the printers 102 and 103 due to abnormality of printer monitoring software or the like, the processing routine advances to step S613. The presence or absence of an instruction at the time of abnormality of the system is discriminated with reference to the output destination changing process instruction table.

The process in step S613 as mentioned above is executed by the output destination determining means constructed as a program by the computer system of the host computer 101.

If the instruction regarding the output destination change at the time of the abnormality of the system is not issued from the user, the processing routine advances to steps S608, S609, and S604 in accordance with the initial setting, and the automatic output destination change as mentioned above is executed.

In step S613, for example, if an instruction of the user exists in the output destination change instruction table 700 as shown in FIG. 7, step S607 follows. According to a procedure in step S607 and subsequent steps, in a manner similar to that mentioned above, the discrimination about the presence or absence of the automatic output destination change or the interlocking with the manual output destination change can be selectively performed even in the case where the state of the printer 102 cannot be obtained.

As mentioned above, the control is made in a manner such that in the case where the state of the printer cannot be obtained on the personal computer (PC) 101 side irrespective of the states of the printers 102 and 103 due to abnormality of the system, the automatic output destination change is not executed. Therefore, the printer 102 whose state is unknown can be set to the output destination as it is or the output destination can be changed by the manual operation of the user.

Thus, in addition to the foregoing effect, even if the states of the printers 102 and 103 cannot be obtained due to the fault of the system, it is possible to allow the desired printer of the user to output the print job.

Although the embodiment has been described with respect to the example of the printing process from the host computer (PC) 101 to the printers 102 and 103, the invention can be also applied to an output apparatus other than the printer, like a copying apparatus having a printing function from the host computer (PC) 101.

The host computer 101 which controls the output apparatus and is arranged as a print control apparatus is not limited to the personal computer (PC) but can be also replaced with another kind of computer such as a workstation. It is also possible that a system in which a plurality of computers operate in an interlocking relational manner shares each function for the output destination change and controls the output apparatus.

Further, naturally, the invention is not limited to the print but can be also applied to any process such as transmitting process by a facsimile apparatus, electronic bulletin board, mail transmission, or the like so long as an output of data which the user can recognize as a document or transmitting process for automatically discriminating alternative means and executing the transmission.

(Other embodiments of the invention)

The invention also incorporates a case where to make various devices operative so as to realize the functions of the embodiment mentioned above, program codes of software for realizing the functions of the embodiment mentioned above are supplied to a computer in an apparatus or system connected to those various devices, and the various devices are made operative in accordance with a program stored in the computer (CPU or MPU) of the system or apparatus.

In this case, the program codes themselves of the above software realize the functions of the embodiment mentioned above, and the program codes themselves and means for supplying the program codes to the computer, for example, a recording medium in which the program codes have been stored construct the invention. As such a recording medium for storing the program codes, for example, a flexible disk, a hard disk, an optical disk, a magnetooptic disk, a CD-ROM, a magnetic tape, a non-volatile memory card, an ROM, or the like can be used.

Naturally, the above program codes are incorporated in the embodiment of the invention not only in a case where the computer executes the supplied program codes, so that the functions of the embodiment mentioned above are realized but also in a case where the functions of the embodiment mentioned above are realized by the program codes in cooperation with the OS (Operating System) which is operating on the computer, another application software, or the like.

Further, naturally, the invention also incorporates a case where the supplied program codes are stored into a memory equipped for a function expanding board of a computer or a function expanding unit connected to a computer and, thereafter, a CPU or the like equipped for the function expanding board or function expanding unit executes a part or all of actual processes on the basis of instructions of the program codes, and the functions of the embodiment mentioned above are realized by those processes.

As many apparently widely different embodiments of the present invention can be made without departing from the spirit and scope thereof, it is to be understood that the invention is not limited to the specific embodiments thereof except as defined in the appended claims.

As mentioned above, according to the invention, since the output destination of the job is determined from a plurality of output apparatuses in accordance with the state of the set output apparatus which has been set so as to be used for outputting the job, even if the job cannot be outputted by the output apparatus, the presence or absence of the output destination change can be controlled in accordance with the state of the output apparatus. The desired output apparatus of the user can be set to the output destination of the job.

Therefore, in the case of the fault of the output apparatus which can be relatively easily recovered, the mode such that the output destination is not automatically changed can be set. A situation such that the load of another output apparatus is wastefully increased is eliminated. The stress of the user who uses another output apparatus can be reduced.

Even in the case where the state of the output apparatus is unknown and the difficulty of recovery of the output apparatus is unknown or the case where the state of the output apparatus cannot be obtained and held due to the fault at a position different from that of the output apparatus and the discrimination of the situation of the output apparatus becomes inaccurate, the presence or absence of the output destination change can be controlled. A load of another output apparatus or the stress of the user who uses another output apparatus can be reduced.

According to another aspect of the invention, when the output destination of the job is determined in accordance with the state of the output apparatus, it is possible to shift to the manual output destination changing function. Therefore, both of the manual output destination changing function and the automatic output destination changing function can be used. The user can decide the output destination by himself in accordance with various situations in which the job cannot be outputted from the output apparatus.

According to further another aspect of the invention, since the output destination of the job is determined on the basis of the contents which have previously been registered, either the mode to control the presence or absence of the output destination change or the mode to shift to the manual output destination changing function can be arbitrarily selectively used by the user in accordance with various situations in the case where the state of the output apparatus is detected, the case where the state of the output apparatus is unknown due to the fault of the output apparatus, and the case where the state of the output apparatus cannot be obtained and held due to the fault at a position different from the output apparatus.

What is claimed is:

1. An information processing apparatus for communicating with a plurality of printing apparatus via network, comprising:
   an obtaining unit adapted for obtaining, via the network, a state of one of the plurality of printing apparatus to which a print job is to be output by said information processing apparatus;
   a condition managing unit adapted for managing a proxy condition regarding whether automatic proxy is executed for automatically changing the output destination of the print job or a manual proxy screen is displayed on a display unit to instruct manual proxy for manually changing the output destination of the print job in accordance with an instruction from the user, in correspondence to contents of fault of each printing apparatus;
   a proxy discriminating unit adapted for discriminating whether the automatic proxy is to be executed or the manual proxy screen is to be displayed, the discrimination being executed based on whether the state of the one printing apparatus obtained by said obtaining unit is managed by said condition managing unit as a fault for executing the automatic proxy or a fault for displaying the manual proxy screen; and
   a determining unit adapted for automatically changing the output destination of the print job if said proxy discriminating unit discriminates that the automatic proxy is to be executed, and for determining the output destination of the print job in accordance with the instruction entered on the manual proxy screen if said proxy discriminating unit discriminates that the manual proxy screen is to be displayed.

2. An apparatus according to claim 1, wherein said condition managing unit can be set mode in which the automatic proxy and the displaying of the manual proxy screen are not executed in accordance with the kind of the state of the printing apparatus.

3. An apparatus according to claim 1, wherein when the state of a certain printing apparatus obtained unit is unknown, said determining unit does not change the output destination of the print job for the printing apparatus whose state is unknown.

4. An apparatus according to claim 1, wherein when the state of the printing apparatus obtained by said obtaining unit unknown, said determining unit allows the user to enter an instruction about whether the output destination change of the print job is executed or not and an instruction to manually change the output destination, and determine the output destination of the print job in accordance with the instruction entered by the user.

5. An apparatus according to claim 1, wherein said condition managing unit manages a proxy condition regarding whether (a) the automatic proxy is executed, (b) the manual proxy screen is displayed, or (c) neither the automatic proxy nor the displaying of the manual proxy screen is executed, in correspondence to the kind of the state of each printing apparatus, and wherein said proxy discriminating unit discriminates whether the automatic proxy is to be executed, the manual proxy screen is to be displayed, or neither the automatic proxy nor the displaying of the manual proxy screen is to by executed, based on the state of the one printing apparatus obtained by said obtaining unit and the proxy condition managed by said condition managing unit.

6. An apparatus according to claim 1, further comprising a registration unit adapted for changing the proxy condition managed by said condition managing in accordance with designation provided by the user and registering the changed proxy condition.

7. An information processing method for communicating with a plurality of printing apparatuses via a network, comprising:
   an obtaining step of obtaining, via the network, a state of one of the plurality of printing apparatuses to which a print job is to be output;
   a condition managing step of managing a proxy condition regarding whether automatic proxy is executed for automatically changing the output destination of the print job or a manual proxy screen is displayed on a display unit to instruct manual proxy for manually changing the output destination of the print job in accordance with an instruction from the user, in correspondence to contents of fault of each printing apparatus;
   a proxy discriminating step of discriminating whether the automatic proxy is to be executed of the manual proxy screen is to be displayed, the discrimination being executed based on whether the state of the one printing apparatus obtained in said obtaining step is managed in said condition managing step as a fault for executing the automatic proxy or a fault for displaying the manual proxy screen; and
   a determining step of automatically changing the output destination of the print job if said proxy discriminating step discriminates that the automatic proxy is to be executed, and of determining the output destination of the print job in accordance the instruction entered on the manual proxy screen if said proxy discriminating step discriminates that the manual proxy screen is to be displayed.

8. A method according to claim 7, wherein said condition managing step, a mode in which the automatic proxy and the displaying of the manual proxy screen are not executed can be set in accordance with the kind of the state of the printing apparatus.

9. A method according to claim 7, wherein said determining step, when the state of a certain printing apparatus obtained in said obtaining step is unknown, the output destination of the print job for the printing apparatus whose state is unknown is not changed.

10. A method according to claim 7, wherein when the state of the printing apparatus obtained in said obtaining step is unknown, said determining step allows the user to enter an instruction about whether the output destination change of the print job is executed or not and an instruction to manually change the output destination, and determines the output destination of the print job in accordance with the instructions entered by the user.

11. A method according to claim 7, wherein said condition managing step manages a proxy condition regarding whether (a) the automatic proxy is executed, (b) the manual proxy screen is displayed, or (c) neither the automatic proxy nor the displaying of the manual proxy screen is executed, in correspondence to the kind of the state of each printing apparatus, and wherein said proxy discriminating step discriminates whether the automatic proxy is to be executed, the manual proxy screen is to be displayed, or neither the automatic proxy nor the displaying of the manual proxy screen is to be executed, based on the state of the one printing apparatus obtained in said obtaining step and the proxy condition managed in said condition managing step.

12. A method according to claim 7, further comprising a registration step of changing the proxy condition managed in said condition managing step in accordance with designation provided by the user and registering the changed proxy condition.

13. A program embodied on a computer-readable medium for an information processing method for communicating with a plurality of printing apparatus via a network, wherein said program allows a computer to execute:
   an obtaining step of obtaining, via the network, a state of one of the plurality of printing apparatuses to which a print job is to be output;
   a condition managing step of managing a proxy condition regarding whether automatic proxy is executed for automatically changing the output destination of the print job or a manual proxy screen is displayed on a display unit to instruct manual proxy for manually changing the output destination of the print job in accordance with an instruction from a user in correspondence to contents of fault of each printing apparatus;
   a proxy discriminating step of discriminating whether the automatic proxy is to be executed or the manual proxy screen is to be displayed, the discrimination being executed based on whether the state of the one printing apparatus obtained in said obtaining step is managed in said condition managing step as fault for executing the automatic proxy or a fault for displaying the manual proxy screen; and
   a determining step of automatically changing the output destination of the print job if said proxy discriminating step discriminates that the automatic proxy is to be executed, and of determining the output destination of the print job in accordance with the instruction entered on the manual proxy screen if said proxy discriminating step discriminates that the manual proxy screen is to be displayed.

14. A program embodied on a computer-readable medium according to claim 13. wherein in said condition managing step, a mode in which the automatic proxy and the displaying of the manual proxy screen are not executed can be set in accordance with the kind of the state of the printing apparatus.

15. A program embodied on a computer-readable medium according to claim 13, wherein in said determining step, when the state of a certain printing apparatus obtained in said obtaining step is unknown, the output destination of the print job for the printing apparatus whose state is unknown is not changed.

16. A program embodied on a computer-readable medium according to claim 13, wherein when the state of the printing apparatus obtained in said obtaining step is unknown, said determining step allows the user to enter an instruction about whether the output destination change of the print job is executed or not and an instruction to manually change the output destination, and determines the output destination of the print job in accordance with the instruction entered by the user.

17. A program embodied on a computer-readable medium according to claim 13, wherein said condition managing step manages a proxy condition regarding whether (a) the automatic proxy is executed, (b) the manual proxy screen is displayed, or (c) neither the automatic proxy nor the displaying of the manual proxy screen is executed, in correspondence to the kind of the state of each printing apparatus, and wherein said proxy discriminating step discriminates whether the automatic proxy is to be executed, the manual proxy screen is to be executed, based on the state of the one printing apparatus obtained in said obtaining step and the proxy condition managed in said condition managing step.

18. A program embodied on a computer-readable medium according to claim 13, further comprising a registration step of changing the proxy condition managed in said condition managing step in accordance with designation provided by the user and registering the changed proxy condition.

* * * * *

UNITED STATES PATENT AND TRADEMARK OFFICE
CERTIFICATE OF CORRECTION

| | |
|---|---|
| PATENT NO. | : 7,277,194 B2 |
| APPLICATION NO. | : 10/268903 |
| DATED | : October 2, 2007 |
| INVENTOR(S) | : Wanda |

It is certified that error appears in the above-identified patent and that said Letters Patent is hereby corrected as shown below:

<u>COLUMN 1</u>

Line 65, "ignate" should read --ignates--.

<u>COLUMN 6</u>

Line 7, "conforms" should read --confirms--.

<u>COLUMN 8</u>

Line 33, "return" should read --return to--.

<u>COLUMN 9</u>

Line 40, "conforms" should read --confirms--.

<u>COLUMN 12</u>

Line 5, "apparatus" should read --apparatuses-- and "network," should read --a network,--;
    Line 8, "apparatus" should read --apparatuses--;
    Line 37, "be" should be deleted and "mode" should read --a mode--;
    Line 42, "obtained unit" should read --obtained by said obtaining unit--;
    Line 49, "unknown," should read --is unknown,--;
    Line 52, "determine" should read --determines--; and
    Line 53, "instruction" should read --instructions--.

<u>COLUMN 13</u>

Line 3, "condition managing" should read --condition managing unit--;
    Line 23, "displayed," should read --be displayed,--;
    Line 33, "accordance" should read --accordance with--;
    Line 37, "wherein" should read --wherein in--; and
    Line 42, "wherein" should read --wherein in--.

UNITED STATES PATENT AND TRADEMARK OFFICE
CERTIFICATE OF CORRECTION

PATENT NO.        : 7,277,194 B2
APPLICATION NO.   : 10/268903
DATED             : October 2, 2007
INVENTOR(S)       : Wanda It is certified that error appears in the above-identified patent and that said Letters Patent is hereby corrected as shown below:

<u>COLUMN 14</u>

Line 8, "apparatus" should read --apparatuses--;
    Line 27, "fault" should read --a fault--; and
    Line 57, "instruction" should read --instructions--.

<u>COLUMN 15</u>

Line 1, "be executed," should read --be displayed, or neither the automatic
        proxy nor the displaying of the manual proxy screen is to be executed,--.

Signed and Sealed this

Seventeenth Day of November, 2009

David J. Kappos
*Director of the United States Patent and Trademark Office*